United States Patent
Lin

(10) Patent No.: US 6,823,731 B1
(45) Date of Patent: Nov. 30, 2004

(54) LIQUID LEVEL SENSING ASSEMBLY AND METHOD FOR MEASURING USING SAME

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/683,742

(22) Filed: Oct. 10, 2003

(51) Int. Cl.[7] .......................... G01F 23/00; G08B 21/00
(52) U.S. Cl. ...................... 73/304 C; 116/227; 340/620
(58) Field of Search .......................... 73/304 C, 304 R; 116/227; 367/908; 340/620; 342/124

(56) References Cited

U.S. PATENT DOCUMENTS 6,164,132 A  * 12/2000  Matulek .................... 73/304 C

* cited by examiner

Primary Examiner—Hezron Williams
Assistant Examiner—Tamiko Bellamy
(74) Attorney, Agent, or Firm—Jimmy L. Funke

(57) ABSTRACT

A sensing assembly senses a level of a liquid in a reservoir. The sensing assembly includes a first input port for receiving a first input voltage signal. The sensing assembly also includes a second input port for receiving a second input voltage signal. An excitation circuit is electrically connected to the first and second input ports for receiving the first and second input voltage signals and for generating a first excitation signal and a second excitation signal. A receiving circuit is disposed adjacent the excitation circuit and defines a variable capacitance with the excitation circuit. The receiving circuit produces an output voltage variable with the level of the liquid in the reservoir due to capacitance changes between the excitation circuit and the receiving circuit. The receiving circuit includes a first receiving electrode extending through a sine wave form and a second receiving electrode extending through a cosine wave form. The capacitance changes are due to dielectric changes created by the presence of the liquid adjacent at least a portion of the sensing assembly.

18 Claims, 5 Drawing Sheets

LIQUID LEVEL SENSING ASSEMBLY AND METHOD FOR MEASURING USING SAME

BACKGROUND ART

1. Field of the Invention

The invention relates to fluid level sensing assemblies. More particularly, the invention relates to fluid level sensing assemblies capable of accurately determining the level of a fluid within a reservoir by analyzing output signals of the fluid level sensing assembly.

2. Description of the Related Art

The storage and delivery of liquids is an important feature of many mechanisms. In an automotive environment, proper delivery of liquids is essential for the functioning and maintenance of a motor vehicle. By way of example, a motor vehicle will not function without fuel, typically liquid gasoline. That same motor vehicle will not function properly without the proper amount of oil stored in the internal combustion engine allowing it to lubricate and cool itself. These are just two fluids in a particular environment that require close observation to make sure its host mechanism, i.e., the motor vehicle, can operate properly.

Currently, there are a number of ways in which a fluid level may be measured. The mechanisms used to measure the fluid level help determine if more fluid is required in order to continue the proper maintenance and operation of the host mechanism. Fluid level measuring mechanisms include floating arm mechanisms, pressure sensors, capacitive sensors, and ultrasonic sensors. The most commonly used fluid level measuring system is the floating arm mechanism.

The floating arm mechanism is an imperfect mechanism for several reasons. First, the floating arm mechanism requires moving parts inside a liquid-filled container. This requires increased time to install the floating arm mechanism and seal it and the container or reservoir. Resistive strips used by the floating arm mechanism are susceptible to contamination and can develop contact problems. The contamination and contact problems result in erroneous measurements.

SUMMARY OF THE INVENTION

A sensing assembly senses a level of a liquid in a reservoir. The sensing assembly includes a first input port for receiving a first input voltage signal. The sensing assembly also includes a second input port for receiving a second input voltage signal. An excitation circuit is electrically connected to the first and second input ports for receiving the first and second input voltage signals and for generating a first excitation signal and a second excitation signal. A receiving circuit is disposed adjacent the excitation circuit and defines a variable capacitance with the excitation circuit. The receiving circuit produces an output voltage variable with the level of liquid in the reservoir due to capacitance changes between the excitation circuit and the receiving circuit. The capacitance changes are due to dielectric changes created by the presence of the liquid.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
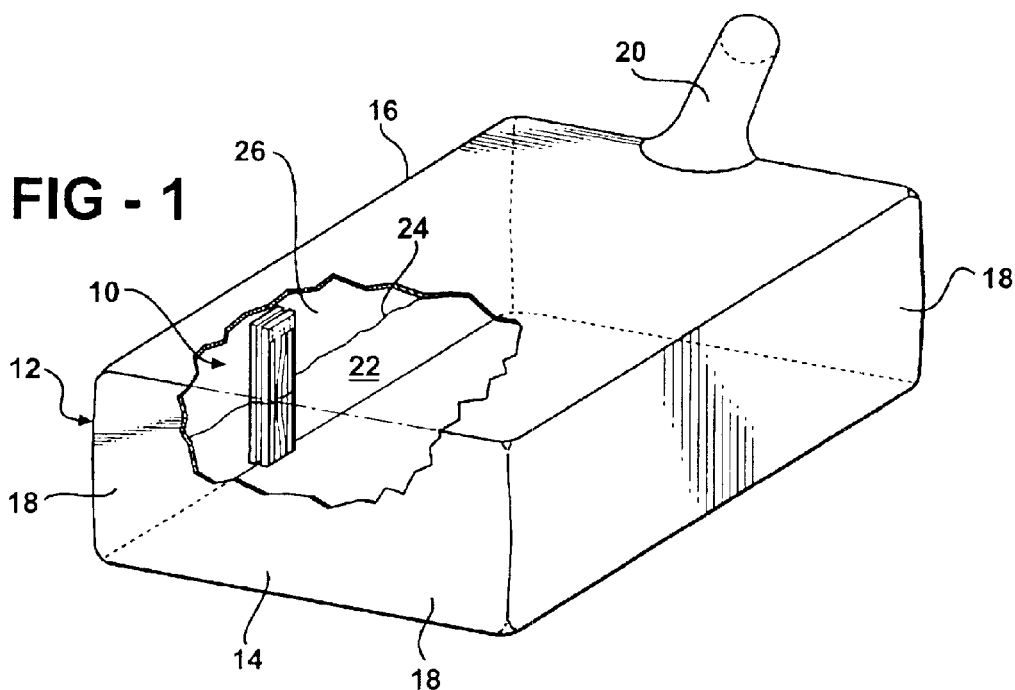
FIG. 1 is a perspective view of a reservoir, partially cut away, showing one embodiment of the invention and a liquid stored therein.

Referring to FIG. 1, the invention, a sensing assembly, is generally indicated at 10. The sensing assembly 10 is mounted to a reservoir 12 having a bottom surface 14, a top surface 16 connected together by a plurality of side walls 18. An inlet 20 allow a liquid 22 to enter the reservoir 12 and be stored therein. The liquid 22 defines a level 24 that is to be sensed by the sensing assembly 10. Typically, air 26 fills the portion of the reservoir 12 that is not occupied by the liquid 22.

Figure 2:
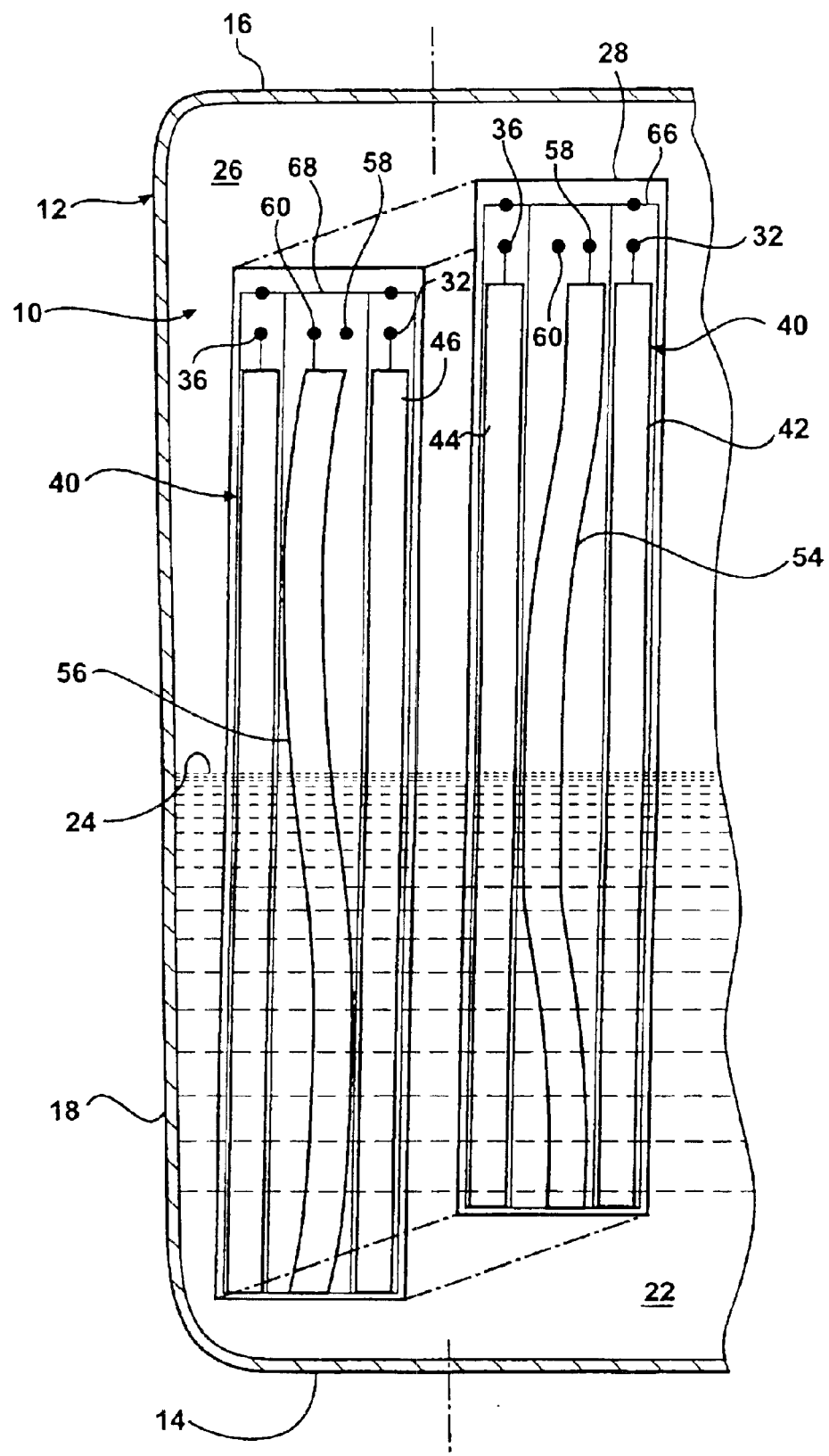
FIG. 2 is a cross-sectional side view, partially cut away, of a reservoir that is partially filled with liquid with an exploded side view of the invention mounted to the reservoir.
Figure 2A:
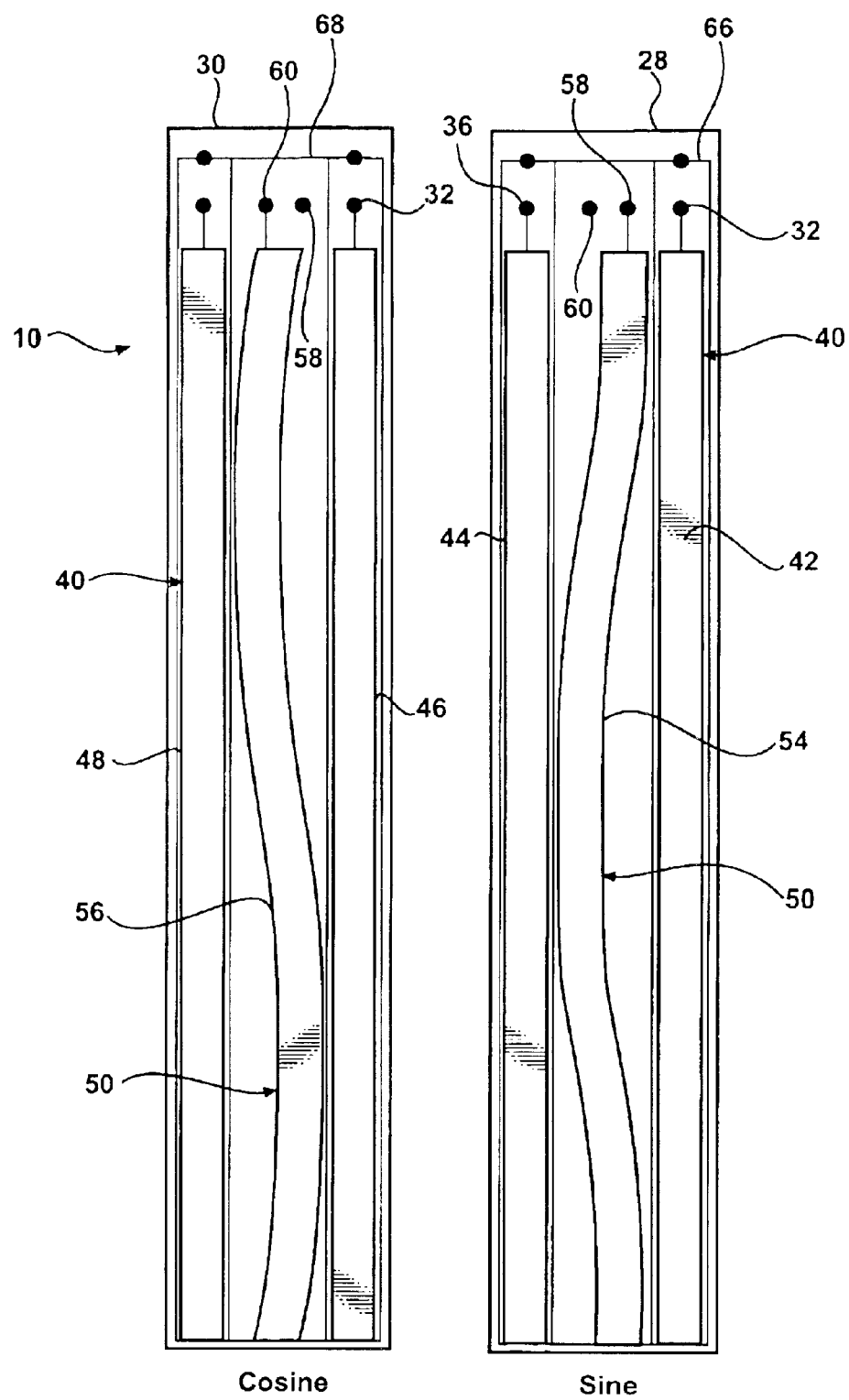
FIG. 2A is a side view of the invention separated into halves.

Referring to FIGS. 2 and 2A, the sensing assembly 10 is shown to have first 28 and second 30 substrates. The substrates 28, 30 are used to mount circuitry (discussed subsequently) thereto. While only the first 28 and second 30 substrates are shown, it should be appreciated that other substrates may be incorporated into the design of the invention 10. These substrates may extend between the first 28 and second 30 substrates should it be desired to further isolate the circuitry extending along each of the substrates 28, 30.

Figure 3:
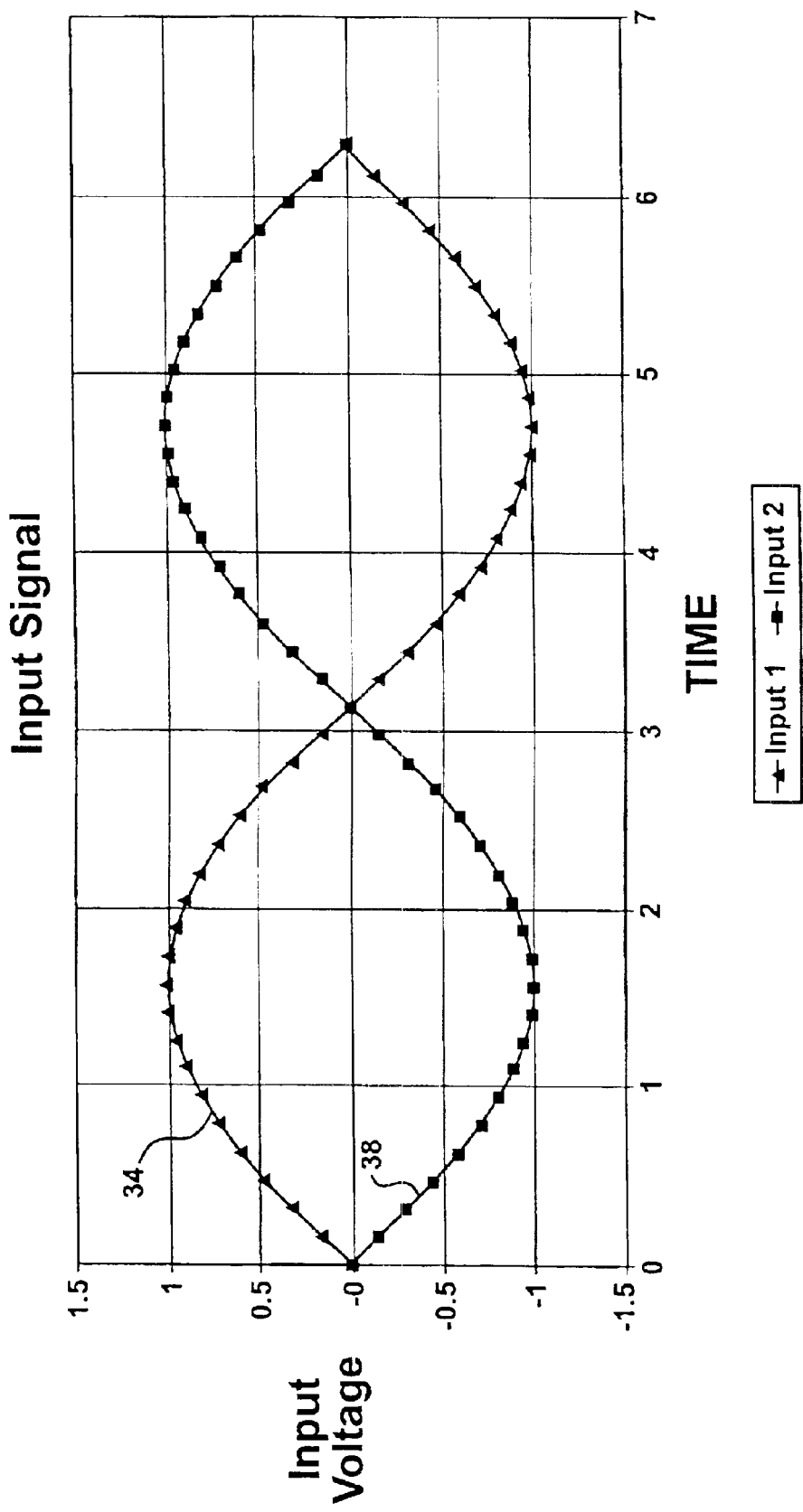
FIG. 3 is a graphic representation of the input signal utilized by the invention.

The sensing assembly 10 includes a first input port 32. The first input port 32 receives a first input voltage signal 34 (FIG. 3). The first input port 32 extends through the substrates 28, 30 allowing circuitry in each of these substrates 28, 30 to receive the first input voltage signal 34.

The sensing assembly 10 also includes a second input port 36 that extends between the substrates 28, 30. The second input port 36 receives a second input voltage signal 38 (FIG. 3).

A portion of an excitation circuit, generally shown at 40, is electrically connected to the first 32 and second 36 input ports. The excitation circuit 40 receives both the first 34 and second 38 input voltage signals. The excitation circuit 40 generates two excitation signals. A complete discussion of the electrical circuit is set forth below.

The excitation circuit 40 includes four excitation electrodes 42, 44, 46, 48. The first 42 and third 46 excitation electrodes receive a first excitation signal, whereas the second 44 and fourth 48 excitation electrodes receive a second excitation signal. The two excitation signals are generated by the electrodes 42, 44, 46, 48 when they receive the first 34 and second 38 input voltage signals. More specifically, the first 42 and third 46 excitation electrodes create a first excitation signal generated through the receipt of the first input voltage signal 34 and the second 44 and fourth 48 excitation electrodes generate a second excitation signal from the receipt of the second input voltage signal 38.

The first 42 and second 44 excitation electrodes extend along the first substrate 28. The third 46 and fourth 48 excitation electrodes extend along the second substrate 30.

The first 42 and third 46 excitation electrodes are electrically connected to the first input port 32 and the second 44 and fourth 48 excitation electrodes are electrically connected to the second input port 36.

The sensing assembly 10 also includes a receiving circuit, generally shown at 50. The receiving circuit 50 is disposed adjacent the excitation circuit 40 and, together with the excitation circuit 40, defines a variable capacitance for the sensing assembly 10. The receiving circuit 50 produces an output voltage signal, generally shown at 52 in FIG. 4. The output voltage signal identifies the level 24 of the liquid 22 in the reservoir 12. The output voltage signal 52 varies with the level 24 of the liquid 22 in the reservoir 12 due to capacitance changes between the excitation circuit 40 and the receiving circuit 50 due to dielectric changes created by the presence or absence of the liquid 22 along portions of the sensing assembly 10. The output voltage signal 52 will be discussed in greater detail.

The receiving circuit 50 includes first 54 and second 56 receiving electrodes. The first receiving electrode 54 extends between the first 42 and second 44 excitation electrodes. The second receiving electrode 56 extends between the third 46 and fourth 48 excitation electrodes. Therefore, the first receiving electrode 54 extends along the first substrate 28, whereas the second receiving electrode 56 extends along the second substrate 30.

The first receiving electrode 54 extends along a first non-linear path. In the embodiment shown, the first non-linear path is sinusoidal. Likewise, the second receiving electrode 56 extends along a second non-linear path. The second non-linear path differs from the first non-linear path. Again, in the embodiment shown, the second non-linear path is sinusoidal. In addition to being sinusoidal, the second non-linear path is out of phase with the first non-linear path. The second sinusoidal path is out of phase 90 degrees with the first sinusoidal path. Therefore, as is shown in the Figures, the first receiving electrode 54 may be considered to be extending through a sine wave path and the second receiving electrode 56 could be extending through a cosine path. The first receiving electrode 54 is electrically connected to a first output port 58 and the second receiving electrode 56 is electrically connected to a second output port 60. The output voltage signal 52 is transmitted through the first 58 and second 60 output ports to a control circuit (not shown) for analysis to determine the level 24 of the liquid 22.

The receiving circuit 50 generates an output voltage signal 52 that has two components. The first component is a first output voltage signal 62. The second component is a second output voltage signal 64. The first receiving electrode 54 generates the first output voltage signal 62 which, in the preferred embodiment, is a shifted minus cosine signal. The second receiving electrode 56 generates the second output voltage signal 64, which, in the preferred embodiment, is a sine signal. When the control circuit receives each of the first 62 and second 64 output voltage signals, it can map the values of each of these signals 62, 64 to determine the percentage of liquid 22 in the reservoir 12 to determine the level 24 of the liquid 22 therein. Two signals are required because a reading of one signal would produce two potential level readings because each of the output signals repeat through a single cycle of measurements.

The sensing assembly includes first 66 and second 68 traces. The first trace 66 extends along the first substrate 28 and separates the first receiving electrode 54 from the first 42 and second 44 excitation electrodes. Likewise, the second trace 68 extends along the second substrate 30 between the second receiving electrode 56 and the third 46 and fourth 48 excitation electrodes. The traces 66, 68 are connected to ground. The traces 66, 68 reduce parasitic voltages that may be created from the sensing assembly 10 during operation thereof.

Figure 5:
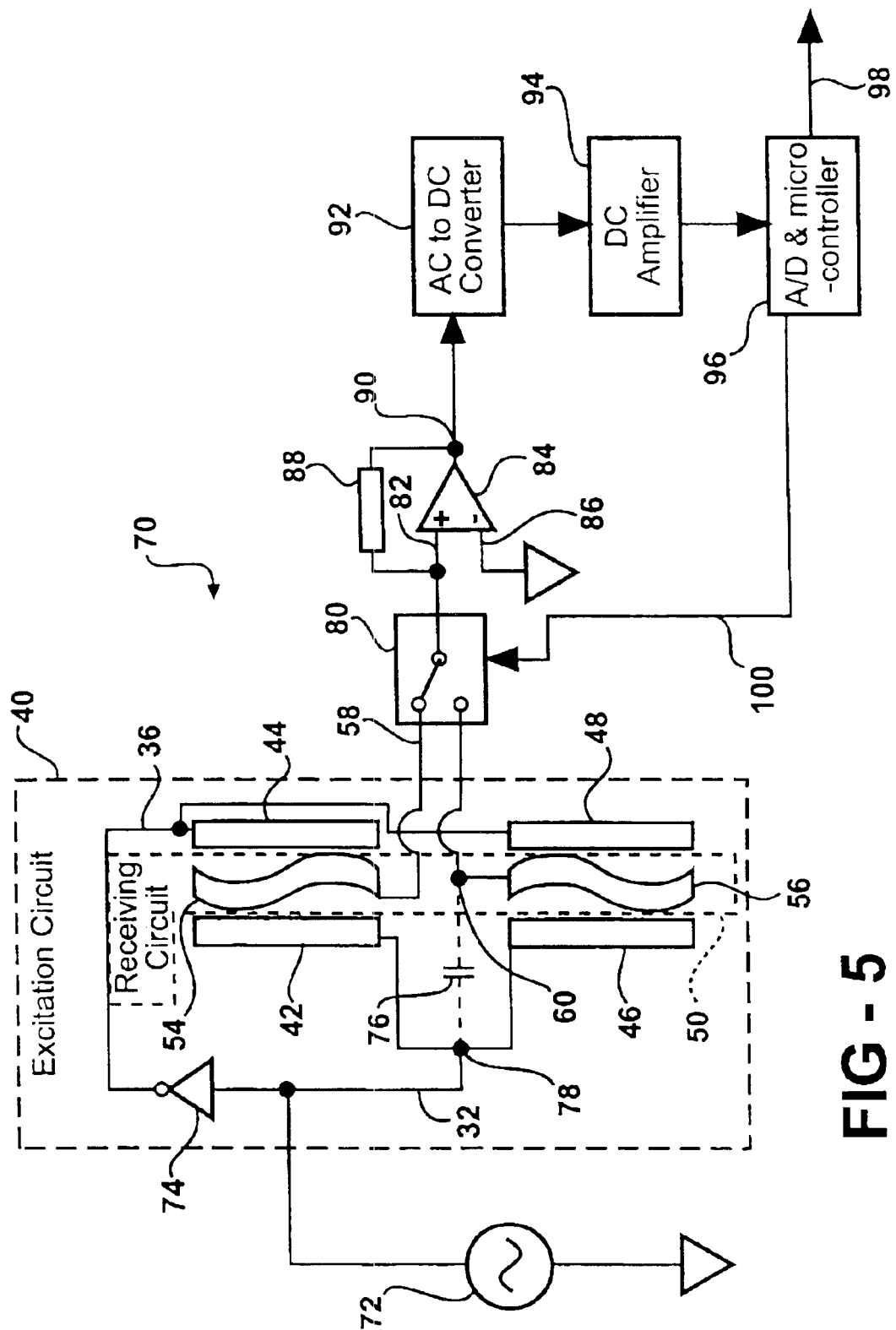
FIG. 5 is a schematic diagram of an electrical circuit utilized by the invention.

Referring to FIG. 5, one embodiment of the electrical circuit controlling the sensing assembly 10 is generally indicated at 70. The electrical circuit 70 includes the excitation circuit 40 and the receiver circuit 50. The excitation circuit 40 is powered by a signal generator 72, whereas the receiving circuit 50, along with the signal condition circuit described subsequently, are powered from another power supply (not shown). The excitation circuit 40 includes the excitation electrodes 42, 44, 46, 48. In the embodiment shown, the first 42 and third 46 excitation electrodes are electrically connected together (they are at the same electrical field potential), and the second 44 and fourth 48 excitation electrodes are electrically connected together (they are at the same electrical field potential). An inverter 74 is connected to the signal generator 72 and the second and fourth excitation electrode 44, 48. It is the inverter 74 that creates the negative sinusoidal input identified as the second input voltage signal 38. A bias capacitor 76 may be needed to avoid phase inverse. The bias capacitor 76 is electrically connected between signal generator 72 and the second output port 60.

The first output port 58 and the second output port 60 are connected to a switch 80 that is controlled by a micro-controller 96. The switch 80 makes the signal condition circuit of the receiver circuit 50 have the capability to alternate receiving signals from the first output port 58, the first receiving electrode 54, and from the second output port 60, the second receiving electrode 56. The amplifier 84 and feedback impedance 88 form a current-to-voltage converter stage. The negative input terminal 86 of the amplifier 84 is connected to ground. The positive terminal 82 of amplifier 84 is connected to both the switch 80 and the one terminal of the feedback impedance 88. The negative terminal 86 is forced to virtual ground. An unbalanced current caused by an unbalanced capacitance between the first receiving electrode 54 and the first 42 and second 44 excitation electrodes generates voltage output 90. The alternated current (AC) voltage signal 90 is then fed into the alternating current (AC) signal to direct current (DC) signal converter 92. This converter 92 converts the AC voltage signal to DC voltage signal. The DC voltage signal is then fed into a DC amplifier 94 to amplify the signal level. Finally, the amplified DC signal feeds into the micro-controller's analog-to-digital converter port and read by the micro-controller 96. The micro-controller 96 can control the switch 80 to select one signal from receiving electrode 54, input port 58, with output signal 62 or from receiving electrode 56, input port 60, with output signal 64.

Figure 4:
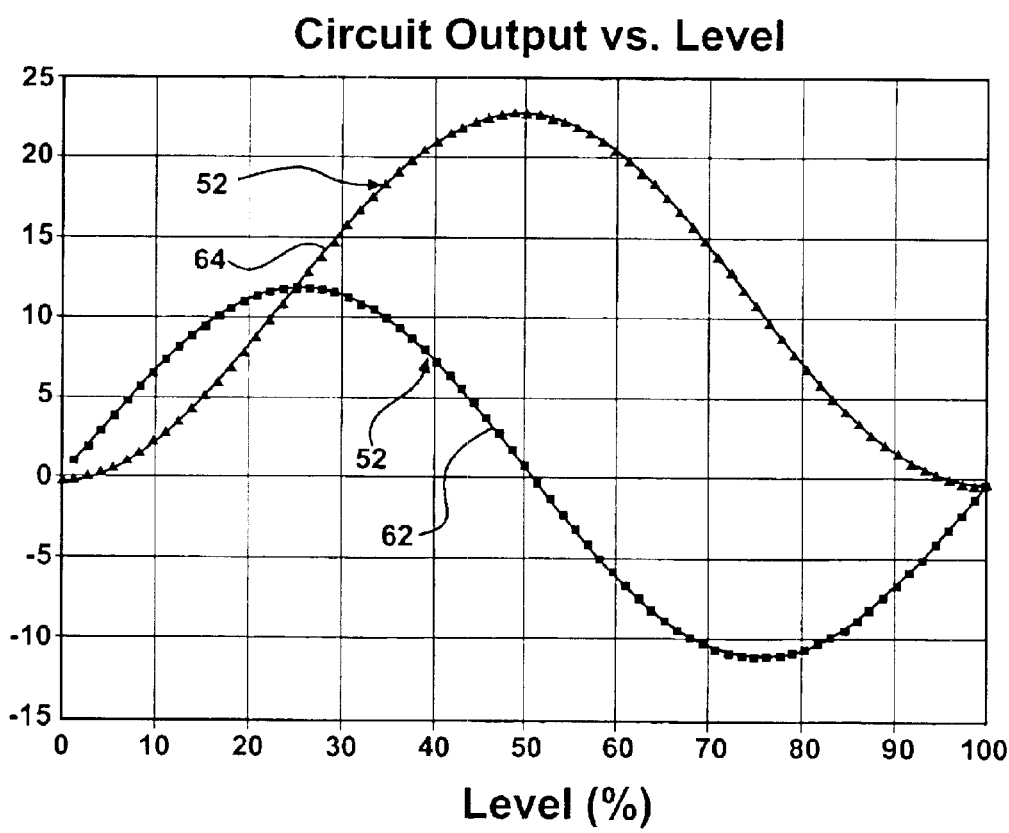
FIG. 4 is a graphic representation of an output of the invention used to determine the level of the liquid in the reservoir.

In operation, the method used for measuring the level 24 of the liquid 22 in the reservoir 12 includes the step of applying the first input voltage signal 34 to the first 42 and the third 46 excitation electrodes and applying the second input voltage 38, that has the same frequency and amplitude as the first input voltage but with 180 degrees phase difference, to the second 44 and fourth 48 excitation electrodes. The micro-controller 96 connects the switch 80 to the input port 58 so the receiving electrode 54 can be selected. Because the terminal 82 is virtually grounded, and the first excitation electrode 42 and the second excitation electrode 44 have the same frequency and amplitude input voltage but with 180-degree phase difference, the capacitance difference between the first receiving electrode 54 to first excitation electrode 42 and the first receiving electrode 54 to second excitation electrode 44 generates the unbalanced current. The unbalanced current through the current-to-voltage converter (amplifier 84 and feedback impedance 88) becomes the voltage signal at the output 90 of the amplifier 84. The voltage signal through signal conditional circuits 92, 94 feeds into A/D port of micro-controller 96 and is converted to digital signal and read by the micro-controller 96 as S1. Then, the micro-controller 96 sets the switch 80 to port 60, e.g., the second receiving electrode 56. This time, the unbalanced current caused by the capacitance difference between the second receiving electrode 56 to the third excitation electrode 46 and the second receiving electrode 56 to the fourth excitation electrode 48 is converted to voltage signal and through AC to DC converter 92, DC amplifier 94, and A/D port by micro-controller 96 as S2. The signal S1 and S2 are varied with level as shown in FIG. 4. The first output voltage signal 62 is the S1 vs. percentage of level 24 and the second output voltage signal 64 is the S2 vs. percentage of level 24. The first S1 and second S2 values are used in the following two equations to calculate the level 24 of liquid 22:

$$\cos(z) = \frac{(S2^2 - S1^2)}{(S1^2 + S2^2)}$$

$$\sin(z) = \frac{2(S1 * S2)}{(S1^2 + S2^2)},$$

where, percentage level =z(in degree)/360. In this embodiment, zero degrees equals 0% full, 90 degrees equals 25% full, 180 degrees equals 50% full, 270 equals 75% full, etc. The signs of equations determine the quadrant of the angle z.

In this invention, the liquid dielectric is not a parameter in the final equations. This is because the dielectric of the liquid cause the curves in the amplitudes of the output voltage signals 62, 64. They change, however, at the same rate. In the equations, the ratio cancels the dielectric effects.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A sensing assembly for sensing a level of liquid in a reservoir, said sensing assembly comprising:
   a first input port for receiving a first input voltage signal;
   a second input port for receiving a second input voltage signal;
   an excitation circuit electrically connected to said first and second input ports for receiving the first and second input voltage signals and for generating a first excitation signal and a second excitation signal; and
   a receiving circuit disposed adjacent said excitation circuit defining a variable capacitance with said excitation circuit, wherein said receiving circuit includes first and second receiving electrodes extending along a portion of the reservoir, wherein said first receiving electrode extends along a first non-linear path and said second receiving electrode extends along a second non-linear path differing from said first non-linear path, said receiving circuit producing an output voltage signal variable with the level of liquid in the reservoir due to capacitance changes between said excitation circuit and said receiving circuit due to dielectric changes created by the liquid.

2. A sensing assembly as set forth in claim 1 wherein said first non-linear path extends along a sine wave shape.

3. A sensing assembly as set forth in claim 2 wherein said second non-linear path extends along a cosine wave shape.

4. A sensing assembly as set forth in claim 3 wherein said excitation circuit includes first and second excitation electrodes extending along a portion of the reservoir, said first and second excitation electrodes disposed adjacent to and separated by said first receiving electrode.

5. A sensing assembly as set forth in claim 4 wherein said excitation circuit includes third and fourth excitation electrodes extending along a portion of the reservoir, said third and fourth excitation electrodes disposed adjacent to and separated by said second receiving electrode.

6. A sensing assembly as set forth in claim 5 including a first trace extending between said first receiving electrode and said first and second excitation electrodes, said first trace connected to ground.

7. A sensing assembly as set forth in claim 6 including a second trace extending between said second receiving electrode and said third and fourth excitation electrodes, said second trace connected to ground.

8. A sensing assembly for sensing a level of liquid in a reservoir, said sensing assembly comprising:
   a first input port for receiving a first input voltage signal;
   a second input port for receiving a second input voltage signal;
   an excitation circuit electrically connected to said first and second input ports for receiving the first and second input voltage signals and for generating a first excitation signal and a second excitation signal; and
   a receiving circuit having first and second receiving electrodes, each disposed adjacent a portion of said excitation circuit, said first receiving electrode extending through a sine wave form and said second receiving electrode extending through a cosine wave form such said receiving circuit produces an output voltage signal variable with the level of the liquid in the reservoir due to capacitance changes between said excitation circuit and said first and second receiving electrodes due to dielectric changes created by the liquid.

9. A sensing assembly as set forth in claim 8 including a switch for selectively reading said output voltage signal from each of said first and second receiving electrodes.

10. A sensing assembly as set forth in claim 9 wherein said excitation circuit includes first and second excitation electrodes extending along a portion of the reservoir, said first and second excitation electrodes disposed adjacent to and separated by said first receiving electrode.

11. A sensing assembly as set forth in claim 10 wherein said excitation circuit includes third and fourth excitation electrodes extending along a portion of the reservoir, said third and fourth excitation electrodes disposed adjacent to and separated by said second receiving electrode.

12. A sensing assembly as set forth in claim 11 including an amplifier for receiving each of said first and second excitation signals and for producing an imbalance current.

13. A method for measuring a level of a liquid in a reservoir using a sensing assembly having first and second receiving electrodes and an excitation circuit having first, second, third and fourth excitation electrodes, all of the electrodes extending through a portion of the reservoir, the method comprising the steps of:

applying a first input voltage signal to the first and third excitation electrodes having a predetermined amplitude and a defined phase;

applying a second input voltage signal to the second and fourth excitation electrodes having the predetermined amplitude and 180 degrees out of phase with the defined phase of the first input signal;

measuring a first capacitance generated between the first excitation electrode and first receiving electrode to create a first measurement;

measuring a second capacitance generated between the second excitation electrode and first receiving electrode to create a second measurement;

measuring a third capacitance generated between the third excitation electrode and the second receiving electrode to create a third measurement;

measuring a fourth capacitance generated between the fourth excitation electrode and the second receiving electrode to create a fourth measurement; and calculating the level of the liquid in the reservoir based on the values of the first, second, third and fourth measurements.

14. A method as set forth in claim 13 wherein the step of calculating the level of the liquid includes calculating the difference between the first and second measurements to create a first difference value.

15. A method as set forth in claim 14 wherein the step of calculating the level of the liquid includes the step of calculating the difference between the third and fourth measurements to create a second difference value.

16. A method as set forth in claim 15 including the step of associating a zero degree value for a bottom surface of the reservoir.

17. A method as set forth in claim 16 including the step of associating a 360 degree value for the top surface of the reservoir.

18. A method as set forth in claim 17 including the step of using the first and second difference values in the equations $$\cos(z) = \frac{(S2^2 - S1^2)}{(S1^2 + S2^2)} \text{ and } \sin(z) = \frac{2(S1 * S2)}{(S1^2 + S2^2)}$$

wherein z is the level of liquid in the reservoir, S1 is the first difference and S2 is the second difference.

* * * * *